Patented Aug. 25, 1925.

1,550,681

UNITED STATES PATENT OFFICE.

CHARLES DOERING AND HENRY H. DOERING, OF CHICAGO, ILLINOIS.

PRODUCT AND PROCESS FOR PRODUCING SAME.

No Drawing.   Application filed April 24, 1922. Serial No. 556,251.

*To all whom it may concern:*

Be it known that we, CHARLES DOERING and HENRY H. DOERING, citizens of the United States, and residents of Chicago, in the county of Cook and State of Illinois, have invented a new and useful Product and Process for Producing Same, described in the following specification.

Our invention relates to a process for producing a milk substitute adapted to the various uses of ordinary animal or cow's milk, without, however, possessing the disadvantages of ordinary milk, as the milky product produced by our process will not deteriorate as rapidly as cow's milk and therefore any food product made from our product will preserve its good, edible quality for a longer period, because the bacilli in our improved milk product require longer time in which to germinate, with the result that such food product will maintain its esculent quality without requiring the same degree of care or refrigeration.

The product produced by our improved process may be used for all purposes where ordinary or cow's milk is employed and with equal or better results; for example, our improved product may be employed in the manufacture of butter substitutes, butterine or oleomargarine, as well as for the making of ice cream;—in fact in certain respects producing a much more satisfactory and superior article.

Our improved process consists in producing a milk or animal milk substitute from rice; the resultant product being determined by a slightly variable predetermined treatment dependable on the consistency of the product desired and the uses to which it is to be put.

Generally stated, the process consists in taking whole rice (namely with the hulls) and water in predetermined quantities, and placing the same in a suitable vessel, hermetically sealed to prevent evaporation and jacketed, whereby the mass may be boiled under pressure; the boiling of the mass to be continued for a predetermined length of time; the pressure in the vessel then gradually reduced and consequently the boiling temperature also diminished, after which the material is conveyed, by suitable means, to mechanism for straining and reducing the granular portions, by attrition or otherwise, and the strainings conveyed to a heated vessel or tank in which the same is agitated while the material is maintained approximately at boiling temperature, but without pressure, whereby the material is oxygenated or aerated before it is allowed to cool.

As a more specific statement of our process, we have found that by taking whole rice and placing the same in a suitable closed vessel with water, approximately in proportions of 1 to 10, will produce a creamy or comparatively thick product. That is to say, the process contemplates taking whole rice and approximately ten parts of water and placing the same in an hermetically sealed vessel to prevent evaporation, which is preferably jacketed whereby to provide a hot water or steam jacket about the sides thereof, and then heating the vessel to bring the contents to boiling point, under approximately twenty pounds pressure and therefore to a temperature substantially equal to 250 degrees Fahrenheit. The contents are kept in the hermetically sealed vessel under the aforesaid mentioned pressure and at the boiling temperature specified preferably for a period of approximately three hours in order that the material may be thoroughly cooked. The pressure in the vessel is then gradually reduced by replacing the hot water or steam in the water jacket, with cold water so as to reduce the pressure in the vessel equal to a temperature of 212 degrees Fahrenheit while maintaining the vessel closed. After the pressure has thus been reduced, the material is conveyed to suitable straining mechanism (which may be open to the atmosphere) adapted, through attrition or otherwise, to reduce any granular portions of the material; the material, while passing through the strainer being kept substantially at boiling point, namely at a temperature approximating 212 degrees, preferably by means of a vessel jacketed to receive hot water or steam. The non-pulverizable or insoluble portions are separated from the fluid which latter is then conveyed to an agitating tank wherein a thorough mixing of the material is induced, by mechanical or other means; the agitation being preferably carried on in a hot water or steam jacketed vessel adapted to maintain the material at a temperature approximating 212 degrees Fahrenheit until a thorough mixing of the material has been accomplished. The mixing operation is preferably accomplished in an open vessel in order that the mass may be thoroughly oxygenated or aerated and given uniform consistency, after which it is allowed to cool, producing a finished product which is adapted to various uses as hereinbefore stated; that is to say, a product adapted for substantially the same uses and purposes as animal milk.

Where the proportions employed are substantially 1 to 10, that is one part of whole rice to ten parts of water, the product produced will be of a creamy consistency and when thoroughly chilled is of a gelatinous nature especially adapted for use in the manufacture of a butter substitute or in the manufacture of ice cream. That is to say, where the product is to be used in making ice cream a proper quantity of sugar, flavoring and butter fat, cocoanut oil or vegetable oil in proportions sufficient to provide the required butter fat, is then added; the product produced by our process containing approximately three and one-half per cent (3½%) butter fat.

When it is desired to produce a product having the consistency of milk,—namely a product somewhat thinner than the creamy product resulting from proportions as hereinbefore set forth,—the proportions are varied by increasing the quantity of water over the quantity of whole rice used, as for example by employing twenty parts water to one part whole rice. Instead of employing a mechanical agitator as above stated, the material after being strained may be forced, by suitable pressure, through a homogenizer, whereby the material is divided into an extremely fine spray which induces thorough oxygenization or aeration, whereby the gelatinous nature of the product will be broken up or altered and a milky fluid produced.

Our improved product, as before stated, may be used as a butter substitute in proportions somewhat as follows—by employing substantially forty per cent (40%) of the rice milk, substantially thirty per cent (30%) of cocoanut oil and substantially thirty per cent (30%) of neutral oil (animal fat) and the combined mass churned to provide butterine; or where an entirely vegetable oleomargarine is to be produced, substantially forty per cent (40%) of rice milk may be employed with substantially sixty per cent (60%) cocoanut oil.

The butter substitute made with our improved product in proportions substantially as above set forth provides a product which will hold its consistency for a greater length of time than is the case with oleomargarine as heretofore produced, as the product does not soften or melt like other butter substitutes, nor does it deteriorate as readily, because the bacilli in our improved product require a longer period of time in which to germinate.

Our improved process, it has been found, produces a product of nutritious quality and which may also be employed in the manufacture of candies, chocolate creams, and the like.

We have found the proportions hereinbefore given to result in a very satisfactory product adaptable to the various uses hereinbefore referred to as well as to all uses for which ordinary milk is commercially employed; and have described the various steps and proportions best adapted to produce the results desired, but certain modifications may be made without, however, departing from the spirit of our invention.

What we claim is:—

1. The herein described process which consists in taking whole rice and water in proportions substantially one to ten, heating the mass in an hermetically sealed vessel under approximately twenty pounds pressure to a temperature approximating 250° F., reducing the pressure while maintaining the mass at boiling temperature, straining the material to separate the soluble portions therefrom, agitating and oxygenating or aerating the liquid while at approximately 212° F. and allowing the mass to cool.

2. The herein described process, which consists in taking whole rice with a predetermined quantity of water, heating same in a closed vessel under substantially twenty pounds pressure for approximately three hours, reducing the pressure to approximately atmospheric pressure while maintaining the mass at a boiling temperature, straining and agitating the material in an open vessel while substantially at boiling temperature and then allowing the liquid to cool.

3. The herein described process, which consists in taking whole rice and water in predetermined portions, heating the same in a closed heat-jacketed vessel to approximately 250° F. for a period of approximately three hours, under substantially twenty pounds pressure, reducing the pressure to substantially atmospheric pressure while maintaining the mass at boiling temperature, straining and agitating the mass and oxygenating or aerating the same while substantially at a boiling temperature and then allowing the mass to cool.

4. The herein described process, which consists in taking whole rice with water in proportions not less than 1 to 10, heating said mass in a closed vessel to approximately 250° F., jacketed to receive a heating medium, maintaining said mass at said temperature approximately for three hours under substantially twenty pounds pressure, introducing a cooling medium in the jacket of the vessel to reduce pressure while maintaining the mass substantially at boiling temperature, straining the mass and subjecting it to agitation in an open vessel while maintaining the mass at substantially boiling temperature and then allowing the same to cool.

5. The herein described process, which consists in heating whole rice and water to approximately 250° F. in a closed vessel, jacketed to receive a heating medium, maintaining said heating under pressure for approximately three hours, reducing the pressure to substantially atmospheric pressure, by the introduction of a cooling medium into the jacket of the vessel while maintaining the mass at boiling temperature, forcing the mass through a strainer and agitator while substantially at boiling temperature, causing the mass while substantially at boiling temperature of 212° F. to be divided into a fine spray and then allowing the mass to cool.

6. The herein described product which consists of rice milk and oil thoroughly mixed in proportions of approximately two-fifths rice milk and three-fifths oil.

7. The herein described product which consists of rice milk, cocoanut oil and neutral oil (animal fat) thoroughly mixed in proportions of approximately four-tenths rice milk, three-tenths cocoanut oil and three-tenths neutral oil (animal fat).

CHARLES DOERING.
HENRY H. DOERING.